Sept. 16, 1941.   W. H. CHURCHILL   2,255,966
BUMPER CLIP AND INSTALLATION THEREOF
Filed July 29, 1939
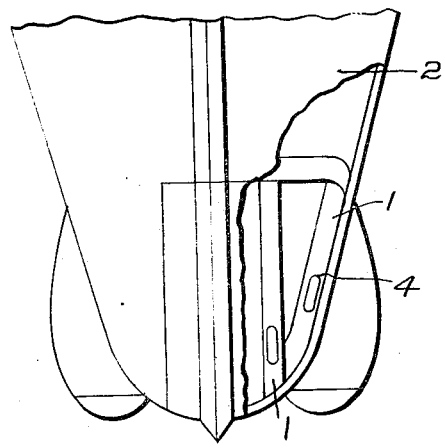
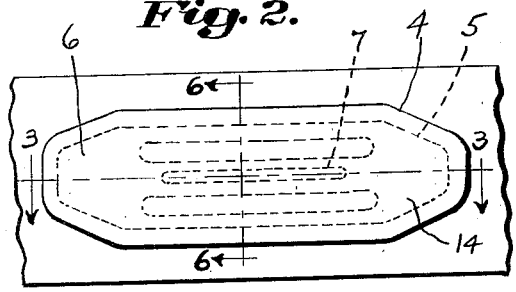
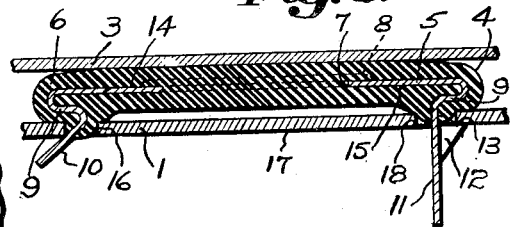
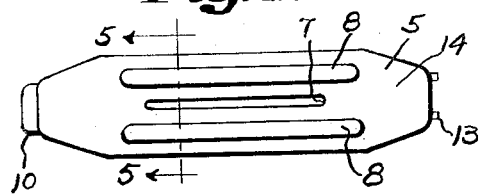
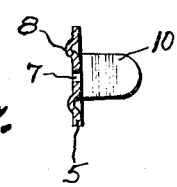
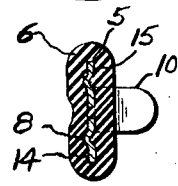
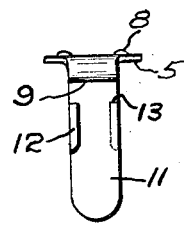
Inventor:
Wilmer H. Churchill.
by John Todd
Att'y.

Patented Sept. 16, 1941

2,255,966

UNITED STATES PATENT OFFICE 2,255,966

BUMPER CLIP AND INSTALLATION THEREOF

Wilmer H. Churchill, Saugus, Mass., assignor to United-Carr Fastener Corporation, Cambridge, Mass., a corporation of Massachusetts Application July 29, 1939, Serial No. 287,375

3 Claims. (Cl. 16—86)

This invention relates to bumper clips of the type adapted to be detachably secured to a support such as a radiator shell so as to provide a cushioning between the shell and another part which may be the hood of an automobile.

An object of my invention is the provision of a bumper clip and clip installation of improved construction over those shown in United States Letters Patent No. 2,167,263 issued to Jesse Allen Bumpus and Clifford S. Christiansen.

One improvement of my bumper clip over that shown by the above-mentioned patent is contained in the improved construction of the same effecting easy and secure assembly of the clip with a supporting part.

Another improvement of my invention over the above-mentioned patent results from a novel construction of the bumper clip enabling the covering, which is preferably of latex rubber, to adhere more securely and permanently to the clip.

Referring to the drawing, in which I have illustrated a preferred embodiment of my invention:

Fig. 1 is a fragmentary plan view showing an automobile front having hood-supporting flanges with my improved bumper clips in assembly with the flanges;

Fig. 2 is an enlarged view of one of my improved bumper clips secured to a support such as the hood-supporting flange shown in Fig. 1;

Fig. 3 is a sectional view along the line 3—3 of Fig. 2 and showing a part such as the hood of an automobile cushioned upon the exposed surface of the bumper clip;

Fig. 4 is a top plan view of the bumper clip before the rubber is applied thereto;

Fig. 5 is a section taken along the line 5—5 of Fig. 4;

Fig. 6 is a section taken along the line 6—6 of Fig. 2 with the supporting structure omitted; and Fig. 7 is an end plan view of the bumper clip prior to applying the rubber covering thereto.

Referring to the drawing, I have illustrated a portion of the body of an automobile showing supporting structures such as hood-supporting strips 1 extending inwardly from the radiator and a hood 2 having flange portions 3 (Fig. 3) adapted to be supported by the strips 1. In my preferred installation each of the strips 1 carries one of my improved bumper clips 4. It should be understood, however, that I do not wish to be limited by the particular use of the bumper clips illustrated and described as they are adapted for use with a variety of installations to perform a number of cushioning objects. Each of the bumper clips 4 is assembled with the respective strip 1 and adapted to provide a cushion preventing metal-to-metal contact between the strips 1 and hood flanges 3 (Fig. 3) which are supported by the strips 1 when the hood is down.

Having reference to my improved bumper clip per se, I have provided one having a metal plate portion 5. The plate 5 has a covering 6 on its outer surface of resilient non-metallic material such as liquid rubber latex effecting a yieldable and noiseless cushioning means between the hood-supporting strips and the hood when the parts of the installation are in normal position. The metal plate portion 5 has an elongated opening 7 within its marginal edges for a purpose hereinafter described. Pressed-out portions 8, which extend outwardly beyond the normal plane of the upper surface of the plate portion 5, are formed on opposite sides of the slot 7 and serve to stiffen the plate. At the same time the pressed-out portions 8 form projecting means on the outer surface of the plate 5 and depressions on the inner surface which effect a desirable unevenness for aiding adherence of the covering 6 to the plate.

Folded-under portions 9—9 (Fig. 3) are formed integral with opposed longitudinal ends of the plate 5 (Fig. 3) and attaching portions or leg portions 10 and 11 integral with the inner ends of the folded-under portions 9—9 extend outwardly from the plate portion 5 and beneath the same. The leg 10, which is relatively rigid, extends outwardly at substantially an acute angle to the normal plane of the respective folded-under portion 9 to provide a substantially hook-shaped means for a purpose to be described. The leg 11 is of yieldable construction and extends from its respective folded-under portion 9 in substantially right-angular relation thereto. The leg 11 provides support-engaging shoulders, in my preferred construction, through means of spaced triangular wings 12 which extend outwardly in perpendicular relation to a broad surface of the leg 11 and provide shoulders 13 (Fig. 7) on their upper sides. The covering 6, in my preferred form, not only covers the top surface 14 of the plate 5 so as to provide a cushion on the exposed surface of the clip, but also the under surface 15 of the plate and portions of the legs 10 and 11 adjacent the folded-under portions 9—9. One of the features of my invention results from provision of the slot 7 in the plate which enables the covering on the top surface 14 of the plate to bond with the covering on the lower surface 15 through the slot. As a result of this construction, the latex covering, which is applied to the clip through dipping the clip into liquid latex and then vulcanizing the film thus formed, adheres firmly and permanently to the metal portions.

Assembly of my improved bumper clip to the supporting structure is carried out through inserting the hook-shaped leg 10 through an aperture 16 of the support (Fig. 3) so that the leg is hooked beneath the lower surface 17 of the support. The leg 11 is brought substantially adjacent another opening 18 of the support by this action and when pressure is exerted upon the clip in the direction of the opening 18, the leg 11 will contract under tension set up in the folded-under portion 9 to allow the shoulders 13 to be forced through the aperture, at which time the leg 11 will spring back toward normal position to engage the shoulders 13 behind the lower surface 17 of the support. Thus the yieldable leg 11 cooperates with the hook-shaped leg 10 to anchor the bumper clip securely in position.

As a result of the fact that I have preferred to cover the folded-under portions 9—9 and portions of the legs 10 and 11 adjacent the respective folded-under portions 9 with the resilient latex covering, the natural tensional qualities of the rubber improve the resiliency of the attachment so as to effect a firm noiseless engagement between the clip and the support. When the clips are assembled with the support the outer surface of the covering 6 provides a noiseless cushioning means for the part to be supported by the clip, as suggested in Fig. 3.

Although I have illustrated and described a preferred embodiment of my invention, I do not wish to be limited thereby because the scope of my invention is best set forth in the following claims.

I claim:

1. A bumper clip comprising a metal plate portion, attaching portions extending away from said plate portion for securing said clip to a support, one of said attaching portions being in the form of a hook for hook engagement with a supporting structure through an aperture thereof, the other of said attaching portions being yieldable and having shoulder means for spring engagement with said supporting structure through an aperture to hold the hook in place, and at least a portion of said plate portion having a covering of non-metallic material.

2. A bumper clip of the class described comprising a metal plate having folded-under portions, attaching portions integral with the inner ends of said folded-under portions extending away from said plate portion for securing said clip to a support, one of said attaching portions being in the form of a hook for hooking engagement with a supporting structure through an aperture thereof, the other of said attaching portions being yieldable and having shoulder means for spring engagement with said supporting structure through an aperture to hold the hook in place, and at least a portion of said plate portion having a covering of non-metallic material.

3. An anti-rattle device in the nature of a snap fastener having a plate-like portion, at least two legs extending from said plate portion for engagement with a support, one of said legs being in the form of a hook for hooking engagement with a supporting structure through an aperture thereof, the other of said legs being yieldable and having shoulder means for spring engagement with said supporting structure through an aperture to hold the hook in place, and the plate and portions of the legs having a covering of resilient material of the nature of latex rubber.

WILMER H. CHURCHILL.